INVENTOR.
CLARENCE GETMAN
BY Richard L. Caelin
HIS ATTORNEY

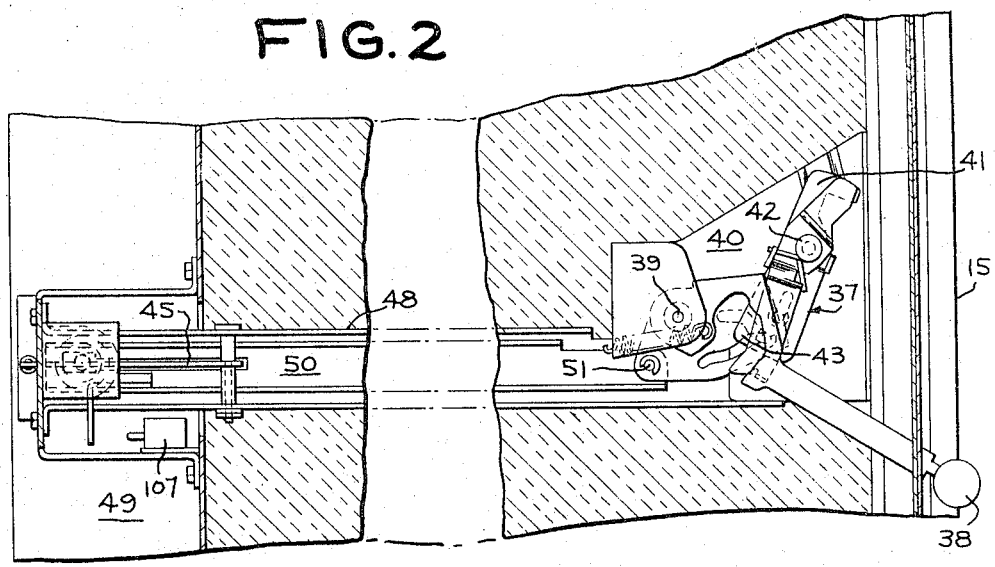
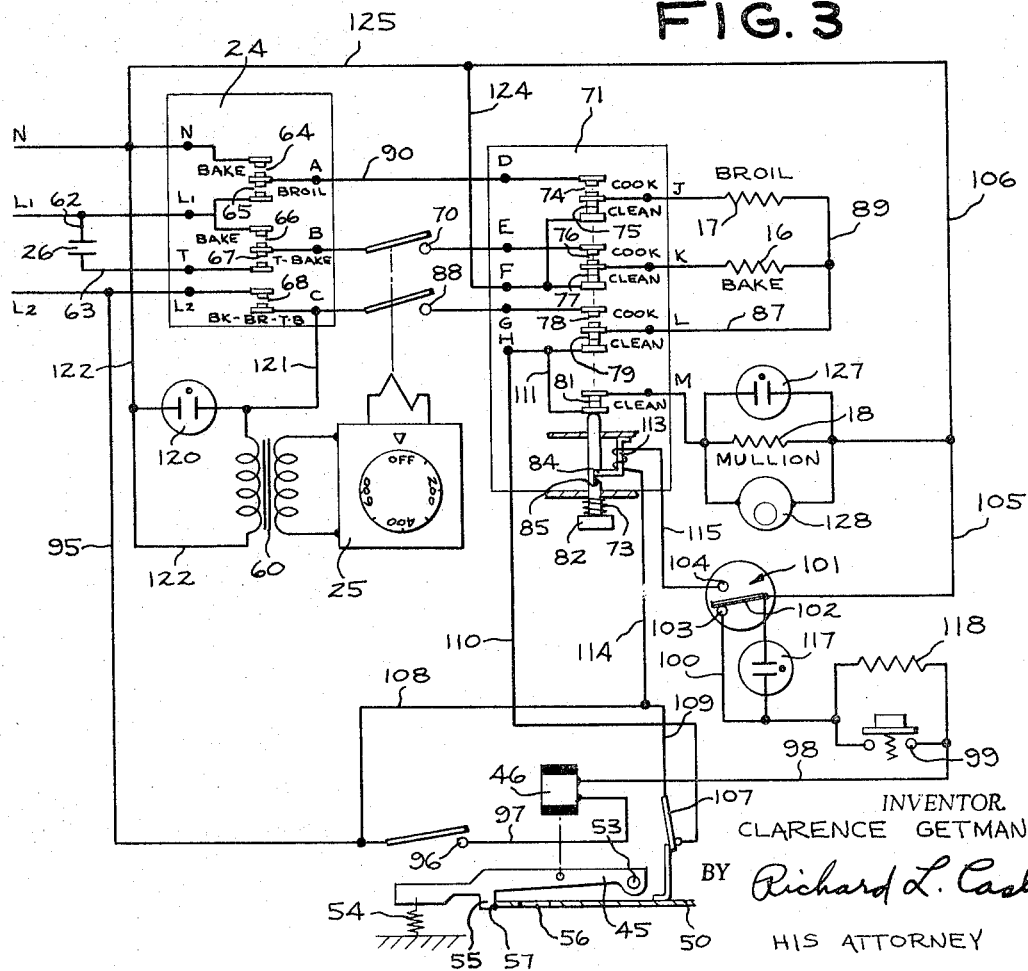

United States Patent Office 3,296,416
Patented Jan. 3, 1967

3,296,416
SAFETY DOOR LATCH AND TEMPERATURE CONTROL CIRCUIT FOR A HEATED CAVITY
Clarence Getman, Louisville, Ky., assignor to General Electric Company, a corporation of New York
Filed Apr. 17, 1964, Ser. No. 360,568
7 Claims. (Cl. 219—396)

The present invention relates to a simplified temperature control circuit for use with a high temperature self-cleaning oven system utilizing the principle of pyrolysis for the removal of the food soils that become lodged on the walls of the oven liner during normal cooking. Such a pyrolytic process is taught in the patent of Bohdan Hurko, No. 3,121,158, which issued on February 11, 1964, and is assigned to the General Electric Company, the assignee of the present invention.

A self-cleaning oven would have the normal cooking functions of baking and broiling within a temperature range between about 150° F. and 550° F., as well as a heat cleaning temperature range somewhere between 750° F. and 950° F. for the chemical decomposition of the food soil by the application of heat so as to complete the cleaning operation within a reasonable time, for example, a heat-up time of about one hour and a cool-down time of about one hour.

Undoubtedly, the major annoyance in using an oven for cooking is the difficulty encountered in keeping the walls of the oven liner clean after repeated usage. It is unavoidable that food particles and grease spatterings will accumulate on the hot oven surfaces during normal cooking operations. Strong chemical cleaning agents have been devised and are commercially available for the express purpose of removing food soil of this type under these conditions. However, even the best of these cleaning agents require a strong rubbing action, and a great deal of time and energy is needed to complete the task satisfactorily. Also, there is a possible safety hazard that the chemicals might cause injury to the user's hands or eyes if the directions for use are not followed verbatim.

Once the method of pyrolysis was perfected for use with the automatic cleaning of a domestic oven, many different systems of applying the heat and controlling the cleaning operation were devised to obtain the desired results. In order to gain the maximum reliability, standard components were used where possible to take advantage of the years of engineering development and know-how gained by working with the components, and they were arranged in fail-safe combinations so that after years of trouble-free usage of the oven, any failure of a component would not constitute a safety hazard. Instead, the failure of these components would render inoperative the heating circuit or function in which the component was designed to operate.

This invention is a modification of an earlier design disclosed and claimed in a copending application of the present applicant, Serial No. 323,809 entitled, "Oven Door Latching System," and filed in the Patent Office on November 14, 1963. It was also assigned to the General Electric Company, the assignee of the present invention.

The present invention is concerned with a simplified temperature control circuit for use with a high temperature oven where such a circuit is independent of the thermostatic control system used for normal cooking operations, and provision is made for an automatic cut-off of the high temperature heating means once the oven temperature reaches a predetermined maximum temperature.

A further object of the present invention is to combine the temperature control circuit of the class described with a safety door latching control circuit to insure that the access door of the oven cannot be unlocked or opened while the oven temperature is above the normal maximum cooking temperature of about 550° F.

A further object of the present invention is to provide a temperature control circuit for a high temperature self-cleaning oven utilizing temperature control means separate from and in addition to the normal temperature control means used during the cooking operation, thereby rendering it unnecessary to provide an expensive temperature control means that is capable of operating through the double temperature range extending from the minimum cooking temperature to the maximum oven cleaning temperature.

A further object of the present invention is to provide a temperature control circuit of the class described to simplify the task of setting up the high temperature operating cycle so the housewife need not obtain lengthy instructions before being able to use this equipment.

A further object of the present invention is to provide a "one-shot" temperature control system of the class described thereby avoiding the necessity for a clock-timer mechanism to hold the cleaning cycle for a predetermined length of time.

A still further object of the present invention is to utilize a single thermal switch means for governing or programming the times for latching and unlatching the oven door, as well as the deenergization of the high temperature heating circuit upon the oven temperature reaching a predetermined maximum cleaning temperature.

The present invention, in accordance with one form thereof, is embodied in a cooking apparatus such as a domestic oven comprising an outer supporting cabinet or body structure; and insulated walls forming an oven cavity, where one wall of the cavity includes a door for gaining access thereto. Electric heating means are provided in heating circuits to effect either a baking operation or a broiling operation and there is a first selector switch means controlling these heating circuits. Then there are electric heating means arranged in a second heating circuit as an alternate to effect a high temperature oven cleaning operation, and there is a second selector switch means for controlling this second heating circuit. This second selector switch means includes a thermal release means that automatically locks this switch in its clean position. Then there is a thermostatic switch positioned in heat transfer relation with the oven cavity and having electrical contacts in circuit arrangement with the said thermal release means, and these contacts are closed when the oven temperature reaches a predetermined maximum temperature within the range 750° F. to 950° F., for example, about 850° F., for operating the thermal release means and de-energizing the second heating circuit. Further modifications include a type of thermostatic switch having three positions and two circuits with one set of contacts that are normally closed at oven temperature below about 550° F., and a second set of contacts closed at the selected temperature of about 850° F. as was mentioned above. The thermostatic switch is open-circuited when the oven temperature is between these two temperatures of 550° F. and 850° F. so as to prevent the possibility of unlatching the oven door unless the oven temperature returns to a temperature below about 550° F.

My invention will be better understood from the following description taken in conjunction with the accompanying drawings and its scope will be pointed out in the appending claims.

FIGURE 2 is a fragmentary plan view taken on the line 2—2 of FIGURE 1 to show the nature of both the door latching means and the means for locking the door latching means during the high temperature heat cleaning operation;

FIGURE 3 is a wiring diagram of both the power and control circuits of the heating system of the oven of the present invention.

Figure 1:
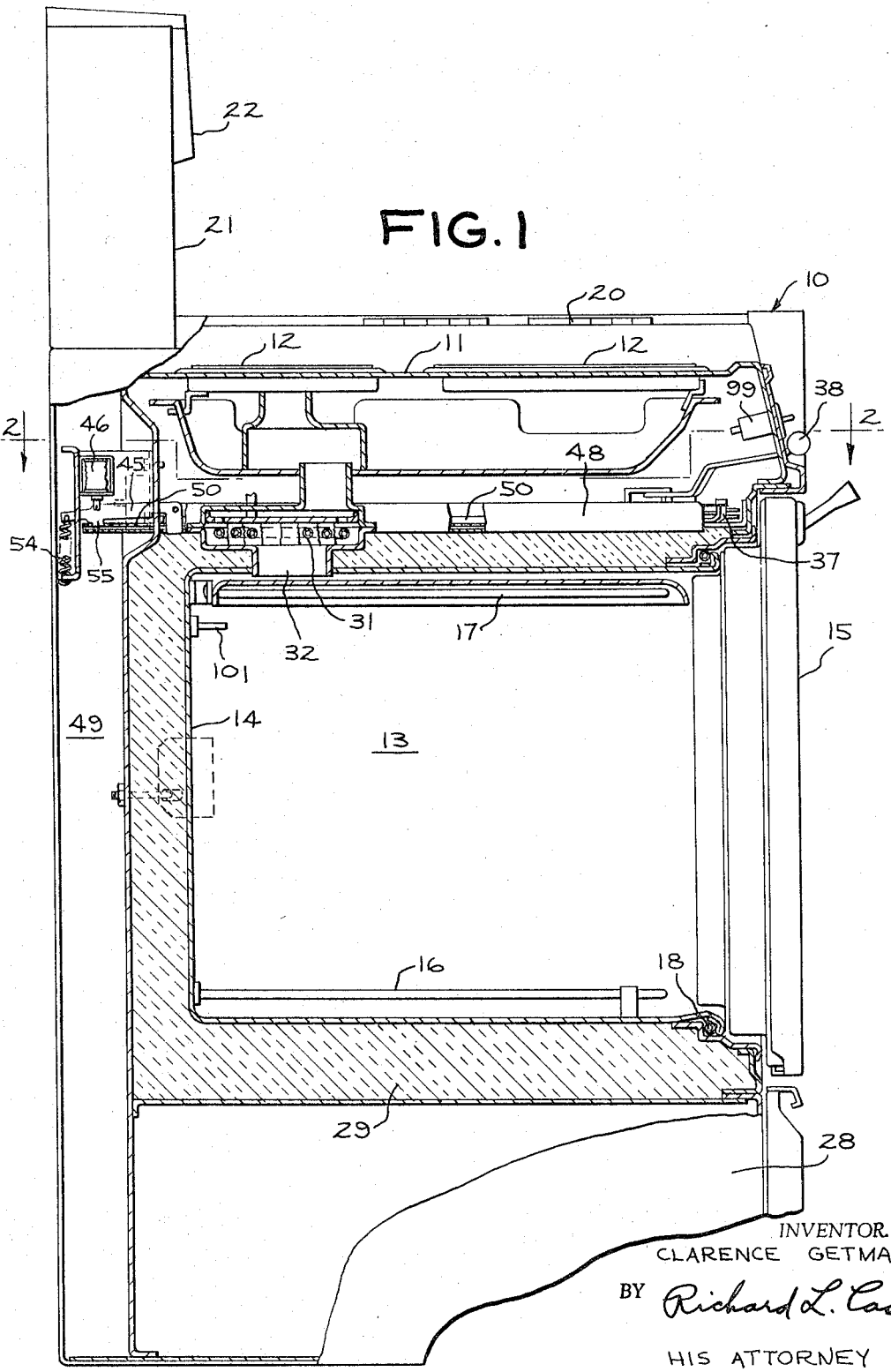
FIGURE 1 is a left-side elevational view of a freestanding electric range with parts broken away and some in cross-section to show the main elements of an oven having the automatic heat cleaning features that are embodied in the present invention.

Turning now to a consideration of the drawings, and in particular to FIGURE 1, there is shown for illustrative purposes a free-standing electric range 10 having a top cooking surface or recessed cooktop 11 containing a plurality of surface heating elements 12, an oven cavity 13 formed by a box-like oven liner 14 and a front-opening drop door 15. The oven cavity 13 is supplied with the two standard oven heating elements; namely, a lower baking element 16 and an upper broiling element 17. A third heating element has been added adjacent the periphery of the oven door 15 to replenish the heat loss in this area and thereby retain generally uniform oven wall temperatures during the self-cleaning cycle. This third heater is identified as a mullion or perimeter heater 18 that is wrapped around the outside of the oven liner; for example, in a manner that is taught by the Newell Patent 3,017,488, which is assigned to the General Electric Company, the assignee of the present invention.

The control of the surface heating elements 12 is obtained by selector switches 20 which are illustrated as multiple pushbutton switches arranged in pairs along the opposite side arms of the cooktop 11 so as to be oriented with the particular heating element that is to be controlled thereby. In addition, the range is provided with a backsplash 21 that is vertically disposed along the back edge of the cooktop 11 and provided with an instrument or control panel 22. This control panel would contain most of the remaining control components of the range such as an automatic surface unit control, an oven selector switch, such as element 24 in FIGURE 3, an oven thermostat or temperature responder 25, an oven clock-timer 26, and possibly indicator lights or pilot lights to show when any one of the heating elements is energized.

Other structural features that might be mentioned by name in passing would be the outer range body or cabinet 28 which has an outer appearance finish of porcelain enamel or the like, and which serves as the super-structure that supports and encloses the various parts of the range. Sandwiched between the oven liner 14 and the range body or cabinet 28 is an extra thick blanket of thermal insulating materials 29 such as fiber glass or the like. The amount of insulation being used has been increased over the amount of insulation of standard ovens because of the high operating temperatures encountered during the heat cleaning operation which may reach a maximum oven air temperature somewhere between 750° F. and 950° F., although preferably at an intermediate level of about 880° F.

During the heat cleaning operation water vapor, free carbon, soot, carbon monoxide gases and other products of combustion are formed and these are treated in the oven before they are returned to the kitchen atmosphere. A catalytic smoke eliminator 31 is positioned in an oven vent opening 32 to serve as an oxidation unit and exhaust means for the oven. This catalytic smoke eliminator is of the type that is taught in the Welch Patent 2,900,483, which is also assigned to the General Electric Company, the assignee of the present invention. Such a smoke, odor and vapor eliminating device includes a heating means in cooperation with a catalytic platinum surface such as a wire screen that is heated to a temperature of about 1300° F. and tends to consume the smoke, odors, and vapors emanating from the oven cavity before these treated gases are expelled into the kitchen.

It has been found necessary to provide a latching means for the oven door 15 to insure that the oven door is first closed and then cannot be opened while the oven is being operated in a heat cleaning cycle. A suitable door latching mechanism is identified as element 37 in FIGURES 1 and 2, although it is best taught and claimed in the applicant's copending application Serial No. 277,174, which was filed on May 1, 1963, and is assigned to the General Electric Company, the assignee of the present invention. Accordingly, only brief mention will be made here of this mechanism as it does not form part of the present invention. The latching mechanism includes a manually operable handle lever 38 which extends through an elongated slot (not shown) in the front edge of the cooktop 11 in a position just above and parallel to the top edge of the oven door 15 as is best seen in FIGURE 1. Referring to FIGURE 2, the handle lever 38 is pivotally supported about a pivotal axis 39 to swing in a horizontal plane from the unlocked position of FIGURE 2 to a locked position that is separated from the unlocked position by an angle of about 60°. Rather than confuse the reader with details of the specific mode of operation of this door latching mechanism it should suffice to say that there is a mounting bracket 40, a handle lever 38, and a latching bolt 41 which is normally recessed within the range body as shown when in the unlocked position of the door and swings out about a pivot point 42 to engage a keeper (not shown) within the inner surface of the door, thus latching the door in a closed position. Several pin and cam slot connections are made between the latch handle 38 and the latching bolt 41 as at 43, but a clear understanding of these is not necessary for an appreciation of the present invention.

Associated with the door latching means 37 is an automatic locking means 45 for locking this door latching mechanism 37 in both the open and closed positions. The purpose for locking the door latching mechanism in its open position is to insure that it cannot be thrown to the closed position inadvertently, while it is locked in the closed position to insure that the door cannot be unlocked and the door opened during any part of the high temperature cleaning cycle. This automatic locking means 45 is positioned at the very back of the oven in a cooler ambient temperature, and hence spaced from the door latching mechanism 37, principally because an electro-responsive means or solenoid 46 cooperates with the automatic locking means 45 for overriding it under certain conditions which will better be understood hereinafter. Both the solenoid 46 and the automatic locking means 45 are supported from an elongated upturned channel-shaped support bracket 48 that is made integral with the mounting bracket 40 of the door latching mechanism 37 and extends rearwardly from the front to the back of the oven. The other end of the support bracket 48 terminates within the wiring channel 49 at the back of the oven. Movably mounted within the support bracket 48 is a connecting rod 50 which is pivotally joined at its front end to the handle lever 38 as at 51. Accordingly, as the handle lever 38 is shifted between its open and closed positions, the connecting rod 50 will reciprocate within the support bracket 48 through a distance of about one inch in actual practice.

As best seen in the assembly view of FIGURE 1, the automatic locking means 45 is a pivoted member that swings about the pivotal axis 53 and is spring biased at its other end in a downward direction by a tension spring 54. It is possible to override the bias of the spring 54 by use of the electro-responsive means or solenoid 46 which has an armature fastened to the automatic locking means 45. This solenoid operator is necessary because the locking means 45 is provided with a locking finger 55 which in one position fits through a mating slot 56 in the connecting rod 50 when the door latching mechanism 37 is in its open position. Thus, the operation of the solenoid 46 tends to lift the finger 55 out of engagement with the slot 56 in the connecting rod so that the handle lever 38 may be thrown to its locked position. This action tends to slide the connecting rod 50 toward the front of the oven and when the door is fully locked the finger 55 will fall behind the rear edge 57 of the connecting rod and automatically lock the door latching mechanism in the closed position as has been mentioned heretofore. Again, the solenoid would be operated to disable the locking means 45 and enable the movement of the handle lever to an open position.

Turning now to a consideration of the circuit diagram of FIGURE 3, the electric range of the present invention is provided with a standard electrical service of 3-wire Edison source of power nominally of 240 volts, single phase, 60-cycle A.C., which is usually available in the average residence having adequate wiring. This voltage source has a pair of line wires L1 and L2 and a grounded neutral conductor N for supplying the oven selector switch 24 and ultimately the electrical load characterized by the three heating elements; namely, the bake element 16, the broil element 17, and the mullion or perimeter heater 18.

The oven selector switch 24 is provided with four line terminals or poles N, L1, T and L2 for connection with the lead wires from the power supply. Terminal T is for use by an oven timer 26 which is merely illustrated by a set of contacts and lead wires 62 and 63 connecting the timer across terminal T and line L1 and the neutral conductor N as will be better understood hereinafter. The selector switch 24 also has three load terminals identified as A, B, and C as well as five sets of switch contacts 64–68 inclusive. These switch contacts are each labeled with the operation that takes place when the respective contacts are closed. For example, during the baking operation the contacts 64, 66 and 68 are closed. During a broiling operation, contacts 65 and 68 are closed, while during a timed baking operation, contacts 67 and 68 are closed. The heat cleaning operation is not controlled by this oven selector switch 24 therefore no provision is made in this switch for the high temperature oven cleaning operation.

There is also a second selector switch 71 which is a two-position gang switch that has its contacts positioned to complete a circuit from the oven selector switch 24 and the heating elements 16 and 17 during normal cooking operations. However, when the contacts are shifted to an opposite position to close with the other contacts, this second selector switch 71 shunts the oven selector switch 24 so as to set up a second heating circuit as an alternate circuit from the baking and broiling circuits in order to obtain a high temperature heat cleaning operation. To be more specific, the second selector switch 71 has line terminals D, E, F, G and H and load terminals J, K, L and M as well as switch contacts 74–79 and 81 where both the even numbered contacts 74, 76 and 78 act in unison and the odd numbered contacts 75, 77, 79 and 81 act in unison, but in an alternate manner. In other words, this switch operates in a manner that in one position, the cooking position, all of the even numbered contacts are closed, and the odd numbered contacts are open. In the cleaning position, the even numbered contacts are open and the odd numbered contacts are closed.

Notice that the contacts are moved by a manual actuator or pushbutton 82 which protrudes out one side of the switch housing and is capable of moving in and out between an open and closed position. The open or cooking position of this switch closes the even numbered contacts 74, 76 and 78, while the depression of the pushbutton 82 serves to close the odd numbered contacts 75, 77, 79 and 81. When the manual actuator 82 is depressed, it is held automatically in the depressed position by a thermal release means 84 which is a bimetallic member that has spring characteristics for engaging in a slot 85 in the shaft of the actuator. Accordingly, the odd numbered contacts are closed in the clean position, namely contacts 75, 77, 79 and 81. A return spring 73 is held under the head of the pushbutton 82 to bias the pushbutton into its outermost or cooking position. This second selector switch 71 has an override feature which enables the housewife to discontinue the heat cleaning cycle at will in the event she changes her mind. The pushbutton 82 of the switch is capable of rotary motion of about one-quarter of a turn. Such motion would drive the thermal release means 84 out of engagement with the slot 85, thereby allowing the return spring 73 to change the switch setting to the outer cooking position.

During normal cooking operations the baking circuit has the bake element 16 connected directly across full voltage of 240 volts from lines L1 to L2, while at the same time the broil element 17 is operated at one-quarter rated wattage at 120 volts from line L2 to neutral N. This can be better understood by tracing the circuit as follows: for the bake element 16, the circuit is from line L1 and line terminal L1 of selector switch 24, through contacts 66 to load terminal B, and then through thermostat contacts 70, to line terminal E of the second selector switch 71, then through closed contacts 76 to load terminal K, and then to bake element 16 through lead 87 back through the second selector switch 71 by means of terminal L, contacts 78 and terminal G, through thermostat contacts 88 to load terminal C of the first selector switch 24, through the common contacts 68 to line terminal L2, and thus line L2. As for the broil element 17 during a baking operation, the circuit is as follows: from line L2 to line terminal L2, through common switch contacts 68 to load terminal C, through thermostat contacts 88 to terminal G of the second selector switch 71, through switch contacts 78 to switch terminal L, through lead 87 and lead 89 to the broil element 17, then to terminal J of the second selector switch 71, through switch contact 74 to terminal D, through lead 90 to load terminal A of the first selector switch 24, and through contacts 64 to line terminal N and thus neutral conductor N.

The broiling circuit has the broil element 17 as the only element that is energized, and it is connected across the 240 volts of lines L1 and L2. The circuit is from line terminal L1, through switch contacts 65 to load terminal A, then by lead 90 to the second selector switch 71 through terminal D, contacts 74 and terminal J, through broil element 17 and then by leads 89 and 87 to switch terminal L, through switch contacts 78 to terminal G, then through thermostat contacts 88 to terminal C of the first selector switch 24, and then through common switch contacts 68 to line terminal L2 and thus line L2.

For the time-baking circuit, the bake element 16 is connected across lines L1 and L2 at rated wattage by means of line terminal T and L2.

Next to be considered is the heat cleaning circuit where all three heating elements 16, 17 and 18 are connected in parallel across one-half line voltage of 120 volts from neutral conductor N to lines L2. In order to operate this circuit it is necessary to first operate the solenoid 46 so as to be able to lock the oven door by means of the handle lever 38, as well as to depress the manual actuator 82 of the second selector switch 71. This last action serves to shunt or override the first selector switch 24 so as to set up the heat cleaning circuit. Before the door latch may be operated, it is necessary to operate the solenoid 46 so as to unlatch the automatic locking member 45 against the force of action of its biasing spring 54 so as to permit manual movement of the door latch. The energizing circuit for the solenoid 46 is from line L2 through lead 95 to a normally open door switch 96 which is mounted on the front of the range body and normally open but closed when the oven door is closed, and through lead 97 to the solenoid. Then from the solenoid through lead 98 to a momentary pushbutton switch 99, through said lead 100 to the low temperature side of a three position, two circuit thermostatic switch 101 that has a temperature sensing probe located within the oven cavity as is seen in FIGURE 1. Then the circuit includes leads 105, 106 and 125 back to neutral N. This thermostatic switch 101 has a bimetallic blade 102 and a pair of fixed contacts 103 and 104. Contacts 102 and 103 are closed at temperatures of about 550° F. and below, while contacts 102 and 104 are cloesd at temperatures of about 850° F. and above. In order to be able to operate the solenoid 46 a circuit must be formed by closing the switch blade 102 and contact 103. Then the circuit is complete between line L2 and neutral conductor N.

Means are also provided to insure that the heat cleaning circuit cannot be completed unless the oven door is locked. Reference is made to a normally open latch switch 107 which is closed only when the door latch handle 38 is closed. This switch closing completes a circuit for energizing the mullion heater 18 across line L2 and neutral conductor N by means of leads 95 from the line L2, through leads 108 and 109, through latch switch 107, and then by lead 110 to terminal H of the second selector switch 71, and then through lead 111 and switch contacts 81 to terminal M, then through mullion heater 18 and finally back to neutral by means of leads 106 and 125.

The second contact 104 of the thermal switch 101 is adapted to make a circuit through a resistance heater 113 that cooperates with the thermal release means 84 of the second selector switch 71. The circuit is across line L2 and neutral by means of lead 95, 108, 114, through the heater 113 and then by lead 115 to the thermal switch 101, and through contact 104 and the movable switch blade 102 and then back to neutral by means of leads 105, 106 and 125. The movable switch blade 102 is depicted diagrammatically as a bi-metallic member that is in heat transfer relation with the oven cavity so that at temperatures of about 550° F. and below the circuit is completed through the switch blade 102 and contact 103. Thus, the solenoid 46 may be actuated when the oven temperature is below about 550° F. by closing the oven door 15 thereby closing the door switch 96, and then by closing the momentary pushbutton switch 99. This, however, will not initiate the heat cleaning circuit unless the oven door is also latched and the latch switch 107 is thereby closed. Finally, the second selector switch 71 is closed by the depression of the actuator 82. At temperatures above about 550° F. the thermostatic switch 101 is open-circuited and it is not closed again until the oven temperature rises to about 850° F. at which time the movable switch blade 102 will engage with contact 104 thus energizing the release heater 113 and quickly disengaging the thermal release means 84 from the manual actuator 82 so as to de-energize the heat cleaning circuit and resetting this switch 71 into its normal cooking position.

A lock lamp 117 of the neon glow lamp type is connected to the movable contact blade 102 so the lamp is energized whenever this switch is in one of its two closed positions; that is, below 550° F. and above 850° F. The usual series resistor 118 of about 5,000 ohms is in series with the neon lamp 117 and shunted across the momentary pushbutton switch 99 so as to continue energizing the lamp after the pushbutton switch 99 is released. Another lamp being used is a pilot light or indicator light 120 which is energized during all normal cooking operations by being connected across line L2 and neutral N by means of lead 121 that joins with load terminal C of the first selector switch 24 and another lead 122 that is connected to neutral conductor N. These same leads 121 and 122 connect the step-down transformer 60 to line L2 and neutral N. The secondary of the transformer supplies an oven responder or thermostat 25. This thermostat 25 is a double pole thermostat having the two thermostat contacts 70 and 88. In a parallel circuit with the mullion heater 18 is a neon glow lamp or "clean" lamp 127 and a catalytic smoke eliminator 128 which are to be energized whenever the mullion heater 18 is energized during a heat cleaning cycle of operation as is well understood in this art.

Perhaps it is well to trace the circuit for the heat cleaning operation. It should be noted that the first selector switch 24 may be in any position because it is taken out of the circuit completely by the operation of the second selector switch 71 in the "clean" position as follows: current flows from line L2 through lead 95, lead 108 and 109, through latch switch 107, lead 110 to the second selector switch 71 and its terminal H, through lead 111 and switch contacts 81 to switch terminal M, through the mullion heater 18, lamp 127 and smoke eliminator 128 and back to neutral N by way of leads 106 and 125. Also, the current divides from switch terminal H through contacts 79 to terminal L and then by leads 87 and 89 through both the bake and broil units 16 and 17 respectively and then back to neutral N through terminals K and J and contacts 77 and 75 to switch terminal F, and then by leads 124 and 125 back to neutral.

Modification of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A heated cavity and an access door for closing and sealing said cavity, electric heating elements for raising the temperature within the cavity, a first selector means for arranging the heating elements in various circuits of different wattages for normal cooking operations, and a second selector means having a setting that is capable of shunting the first selector means for energizing the heating elements in a high temperature cleaning cycle, and door latching means movable between open and closed positions and adapted to hold the door in a closed position during the high temperature cleaning cycle, automatic locking means for locking the door latching means in its closed position, and electro-responsive means capable of deactivating the automatic locking means thereby freeing the door latching means for manual operation, and a three-position, two circuit thermostatic switch positioned within the cavity and having one set of contacts in a series circuit with the electro-responsive means, said set of contacts being closed at oven temperatures below about 550° F., said switch having a second set of contacts closed at a maximum cleaning temperature between 750° F. and 950° F., the said switch being open-circuited at temperatures between about 550° F. and a maximum cleaning temperature, so as to disable the electro-responsive means when the said switch is operating above 550° F., and a thermal release means for the second selector means, the closing of the second set of contacts of the said switch serving to actuate the said thermal release means and cause the second selector means to de-energize the heating elements of the high temperature cleaning cycle.

2. A high temperature oven for domestic oven comprising a cabinet structure enclosing a box-like oven liner that has an open front that is adapted to be closed by an access door, where the oven liner and door define an oven cooking cavity, electric heating elements arranged in a first heating circuit for supplying heat energy into the oven cavity for normal cooking operations between about 150° F. and 550° F. and a second heating circuit for use during a heat cleaning operation above the normal cooking temperature having a maximum temperature somewhere between about 750° F. and 950° F. for removing food soil lodged on the walls of the oven cavity, a first selector switch means for controlling the first heating circuit, and a second selector switch means for controlling the second heating circuit, a release means combined with the second selector switch means for de-energizing the second heating circuit, a door latching mechanism movable between open and closed positions and adapted to hold the access door in a closed position during the heat cleaning operation, automatic locking means for locking the door latching mechanism in its closed position, and electro-responsive means capable of deactivating the automatic locking means so as to free the door latching mechanism for manual operation, and a three-position, two circuit thermostatic switch positioned in heat transfer relation with the oven cavity and circuit connected with the said electro-responsive means, said thermostatic switch having one set of contacts closed at oven temperatures within the normal cooking temperature range of 150° F. and 550° F., and a second set of contacts closed at a maximum temperature somewhere between 750° F. and 950° F. to complete a circuit to the release means of the second selector switch means and thereby de-energize the second heating circuit, the thermostatic switch being open-circuited at temperatures above about 550° F. so as to disable the electro-responsive means when the oven air temperature is above this temperature so as to prevent the opening of the oven door.

3. A cooking apparatus comprising an outer supporting structure, walls forming an oven cavity, one wall of the cavity including a door for gaining access thereto, electric heating means arranged in a first heating circuit to effect either a bake operation or a broil operation, a first selector switch means for controlling the said first heating circuit, electric heating means arranged in a second heating circuit to effect an alternate high temperature oven cleaning operation, a second selector switch means controlling the said second heating circuit, said second selector switch means being a two-position gang switch with a thermal release means, and a thermostatic switch positioned adjacent the oven cavity and having one set of contacts in a series circuit with the said thermal release means, said contacts being closed when the temperature reaches a maximum cleaning temperature somewhere between 750° F. and 950° F. for energizing the thermal release means and de-energizing the second heating circuit in a one-shot operation.

4. A cooking apparatus as recited in claim 3 wherein the electric heating means of the first heating circuit comprises a bake element adjacent the bottom of the cavity and a broil element adjacent the top of the oven cavity, the electric heating means for the second heating circuit including the same bake and broil elements and a third perimeter element adjacent the edge of the oven door to compensate for heat losses through and around the door, the gang switch representing the second selector switch means having a manual actuator that is automatically locked by the thermal release means when the actuator is set, the said release means comprising a bimetallic member that is heated when the said set of contacts of the thermostatic switch are closed as the oven temperature reaches the predetermined maximum temperature.

5. A cooking apparatus as recited in claim 3 comprising door latching means movable between open and closed positions and adapted to hold the door in a closed position during the high temperature oven cleaning operation, automatic locking means for locking the door latching means in both its open and closed positions, and electro-responsive means capable of deactivating the automatic locking means so as to free the door latching means for manual operation, and a three-position, two circuit thermostatic switch associated with the oven cavity and having two sets of contacts, the first set of contacts being in series with the electro-responsive means where the said contacts are closed at oven temperatures below about 550° F., the second set of contacts being in series with the said thermal release means and closed when the oven temperature reaches a predetermined maximum that lies somewhere between 750° F. and 950° F., the thermostatic switch being open-circuited at temperatures above about 550° F., so as to disable the electro-responsive means when the oven temperature is above about 550° F., and thereby prevent the unlocking of the door.

6. A cooking apparatus comprising an outer supporting structure, walls forming an oven cavity, one wall of the cavity including a door for gaining access thereto, electric heating means arranged in a first heating circuit to effect either a bake operation or a broil operation, a first selector switch means for controlling the said first heating circuit, electric heating means arranged in a second heating circuit to effect an alternate high temperature oven cleaning operation, a second selector switch means for controlling the said second heating circuit, said second selector switch means being a gang switch with a thermal release means, a door latching means movable between an open and a closed position and adapted to hold the door in its closed position during the high temperature oven cleaning operation, automatic locking means for locking the door latching means in both its open and its closed positions, and electro-responsive means capable of deactivating the automatic locking means so as to free the door latching means for manual operation, and a three-position, two circuit switch associated with the oven cavity and having two sets of contacts, the first set of contacts being in series with the electro-responsive means where the said contacts are closed at oven temperatures below about 550° F., the second set of contacts being in series with the said thermal release means and closed when the oven temperature reaches a predetermined maximum temperature somewhere between 750° F. and 950° F., said two circuit switch being open-circuited at temperatures above about 550° F. so as to disable the electro-responsive means and thereby prevent the unlocking of the door.

7. A cooking apparatus comprising an outer supporting structure, walls forming an oven cavity, one wall of the cavity including a door for gaining access thereto, electric heating means arranged in the first heating circuit to effect either a bake operation or a broil operation, a first selector switch means for controlling the said first heating circuit, electric heating means arranged in a second heating circuit to effect an alternate high temperature oven cleaning operation, a second selector switch means for controlling the said second heating circuit, said second selector switch means comprising a gang switch having a manual actuator and a thermal release means that automatically locks the actuator in the closed position, the said release means comprising a thermal responsive member which when heated serves to release the actuator and return it to a normal cooking position, a door latching means movable between an open and a closed position and adapted to hold the door in a closed position during the high temperature oven cleaning operation, automatic locking means for locking the door latching means in both its open and its closed positions, and electro-responsive mean capable of overriding the automatic door latching means for manual operation, a three-position, two circuit switch associated with the oven cavity and having two sets of contacts, the first set of contacts being in series with the electro-responsive means where the said contacts remain closed at oven temperatures within a normal cooking temperature range of 150° F. and 550° F., the second set of contacts being in a circuit arrangement with the said thermal release means and closing when the oven temperature reaches a predetermined maximum temperature and remaining closed at all temperatures thereabove, the said two circuit switch being open-circuited at temperatures between the maximum cooking temperature and the maximum cleaning temperature, while preventing the unlocking of the door during a high temperature oven cleaning cycle, as well as serving to de-energize the second heating circuit once the oven temperature reaches the predetermined maximum temperature, and manual means for overriding the thermal release means so as to de-energize the second heating circuit.

References Cited by the Examiner

UNITED STATES PATENTS

| | | | |
|---|---|---|---|
| 3,113,200 | 12/1963 | Hurko | 219—409 |
| 3,121,158 | 2/1964 | Hurko | 219—397 |

RICHARD M. WOOD, *Primary Examiner.*

C. L. ALBRITTON, *Assistant Examiner.*